(12) United States Patent
Saito

(10) Patent No.: US 8,498,050 B2
(45) Date of Patent: Jul. 30, 2013

(54) METHOD OF MANUFACTURING ARRAY SUBSTRATE, ARRAY SUBSTRATE, METHOD OF MANUFACTURING SCREEN, AND SCREEN

(75) Inventor: Atsushi Saito, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/449,688

(22) Filed: Apr. 18, 2012

(65) Prior Publication Data

US 2012/0275020 A1    Nov. 1, 2012

(30) Foreign Application Priority Data

Apr. 27, 2011    (JP) .................................. 2011-099237

(51) Int. Cl.
*G03B 21/56* (2006.01)

(52) U.S. Cl.
USPC .......................................... 359/449; 359/443

(58) Field of Classification Search
CPC ....................................................... G03B 21/56
USPC .......................................... 359/449, 443, 454
See application file for complete search history.

(56) References Cited

U.S. PATENT DOCUMENTS

| | | | | |
|---|---|---|---|---|
| 5,225,935 A * | 7/1993 | Watanabe et al. | ............ | 359/619 |
| 5,543,942 A * | 8/1996 | Mizuguchi et al. | ................ | 349/5 |
| 5,877,889 A | 3/1999 | Um et al. | | |
| 6,129,866 A * | 10/2000 | Hamanaka et al. | ............ | 264/1.7 |
| 6,411,439 B2 * | 6/2002 | Nishikawa | .................... | 359/619 |
| 6,437,918 B1 * | 8/2002 | Hamanaka et al. | ........... | 359/620 |
| 6,898,014 B2 * | 5/2005 | Ohgaki | ......................... | 359/619 |
| 6,961,185 B2 * | 11/2005 | Suehiro et al. | ................ | 359/620 |
| 7,329,611 B2 * | 2/2008 | Uehara et al. | .................. | 438/745 |
| 7,339,758 B2 * | 3/2008 | Shimizu et al. | ............... | 359/896 |
| 7,416,281 B2 | 8/2008 | Nishimura et al. | | |
| 7,525,732 B2 * | 4/2009 | Uehara et al. | ................. | 359/620 |
| 7,643,100 B2 * | 1/2010 | Uehara et al. | .................... | 349/42 |
| 7,678,454 B2 * | 3/2010 | Uehara et al. | ................. | 428/410 |
| 7,889,310 B2 * | 2/2011 | Yoshikawa et al. | ........... | 349/187 |
| 8,197,926 B2 * | 6/2012 | Shinbo et al. | ................. | 428/178 |
| 2002/0060377 A1 * | 5/2002 | Uotani | ........................... | 264/2.5 |
| 2002/0113871 A1 * | 8/2002 | Sakamaki et al. | ............. | 348/106 |
| 2005/0185282 A1 * | 8/2005 | Yamanaka et al. | ............ | 359/619 |
| 2007/0047090 A1 * | 3/2007 | Miyao | ............................ | 359/619 |
| 2010/0149442 A1 * | 6/2010 | Miyao et al. | ....................... | 349/5 |
| 2012/0164387 A1 * | 6/2012 | Watanabe et al. | .............. | 428/156 |
| 2012/0262784 A1 * | 10/2012 | Saito et al. | ..................... | 359/443 |
| 2012/0275020 A1 * | 11/2012 | Saito | ............................. | 359/449 |

FOREIGN PATENT DOCUMENTS

| | | |
|---|---|---|
| JP | 5-156484 A | 6/1993 |
| JP | 10-90612 A | 4/1998 |
| JP | 2004-98506 A | 4/2004 |
| JP | 2010-12574 A | 1/2010 |

\* cited by examiner

*Primary Examiner* — Clayton E. Laballe
*Assistant Examiner* — Kevin Butler
(74) *Attorney, Agent, or Firm* — ALG Intellectual Property, LLC

(57) ABSTRACT

A plurality of convex portions, or concave portions which is transferred in an array shape, and a groove are transferred with respect to the substrate having thermoplasticity by a mold member having shapes of the convex portion, or the concave portion, and a protruding portion as the groove, and substrate transfer processing is included, in which the convex portion, or concave portion, and a protruding portion which are formed in the mold member are transferred to the substrate by pressing the mold member to the substrate.

7 Claims, 7 Drawing Sheets

METHOD OF MANUFACTURING ARRAY SUBSTRATE, ARRAY SUBSTRATE, METHOD OF MANUFACTURING SCREEN, AND SCREEN

The entire disclosure of Japanese Patent Application No. 2011-099237, filed Apr. 27, 2011 is expressly incorporated by reference herein.

BACKGROUND

1. Technical Field

The present invention relates to a method of manufacturing an array substrate, a method of manufacturing an array substrate and a screen, and a screen.

2. Related Art

In the related art, an array substrate in which a plurality of small convex portions, or concave portions is formed to be arrayed has been applied to a screen on which an image is displayed by reflecting projection light which is emitted from a projection-type display device such as a projector. It is known that, in these array substrates, it is possible to use an imprint molding method (hereinafter, referred to as "transfer molding method") as a method of molding resin as a raw material, and to easily form a screen which causes the projection light to be reflected.

In a method of manufacturing the Fresnel lens using hot press (transfer molding method), regarding a method of forming a molding die, a method is disclosed in JP-A-5-156484, in which a conductive resin base material is exposed, the Fresnel lens having a main surface which is processed in a shape of the Fresnel lens pattern is used as a mother die for electroforming the Fresnel lens, and a mold replication is produced from metal which is electro-deposited on the main surface using the electroforming, by using the conductive resin base material.

However, in a method of manufacturing an array substrate by a transfer molding method using the mold replication (hereinafter, referred to as "mold member"), there is a problem in that it is difficult to precisely control a cutout position in which a region where the convex portion or the concave portion is formed by a transfer, and a region where the convex portion or the concave portion is not formed, that is, the outer edge portion which is an unnecessary portion as the array substrate is cut out. In addition, when the raw material is a thin film shaped substrate, or when a large array substrate is used as a screen, there is a case where the outer edge portion is obliquely cut out when being cut out due to a deviation of the position of the array substrate, accordingly, the external dimension of the array substrate becomes uneven. In JP-A-5-156484, the above described problem is not mentioned.

For this reason, a manufacturing method of the array substrate is desired in which the outer edge portion can be cut out with a predetermined dimension, and a region of the substrate where the convex portion or the concave portion are formed can be easily obtained with a predetermined dimension, when transfer molding is performed with respect to the array substrate using a mold member.

SUMMARY

Application Example 1

An array substrate according to the application example includes, a substrate having thermoplasticity, in which a plurality of convex portions, or concave portions which is transferred in an array shape, and a groove portion are transferred to the substrate having thermoplasticity by a mold member having shapes of the convex portion, or the concave portion, and a protruding portion as the groove portion, and the transferred groove is formed to have a depth less than the thickness of the substrate, and is used for cutting out the outer edge portion of the substrate.

According to such an array substrate, the plurality of convex portions, or concave portions which is formed in the array shape, and a groove are simultaneously transferred to and formed on the substrate as the array substrate, by the mold member having the shape of the convex portions, or concave portions which is formed on the substrate, and the groove. In addition, the outer edge portion may be easily cut out by setting the depth of the transferred groove to be less than that of the substrate, when tearing up the substrate, and the outer edge portion which is not necessary as the array substrate, on the basis of the groove which is transferred to the substrate. Accordingly, the gap between the edge of a region of the array substrate where the convex portion or the concave portion is formed and the edge of the array substrate becomes constant, and it is possible to realize an array substrate with high external dimension precision.

Application Example 2

A method of manufacturing an array substrate according to the application example includes, with respect to a substrate having thermoplasticity, transferring shapes of a plurality of the convex portions, or concave portions, and a protruding portion which are formed in a mold member to the substrate, by pressing the mold member to the substrate, in which a mold member which has shapes of the plurality of convex portions, or concave portions, and the protruding portion as a groove which are transferred to the substrate, with respect to the substrate.

According to such a method of manufacturing the array substrate, the plurality of convex portions, or concave portions, and the groove which configures the array substrate may be simultaneously formed, by causing the mold member which has the shapes of the plurality of convex portions, or concave portions, and the protruding portion as the groove which are transferred to the substrate as the array substrate to be pressed to the substrate by the transfer processing. Accordingly, it is possible to cut out the outer edge portion without providing a device for cutting out, by tearing the outer edge portion which is not necessary as the array substrate when performing the cutout, on the basis of the formed groove, without performing an adjustment between the array substrate and a cutout position.

Application Example 3

The method of manufacturing of the array substrate according to the application example further includes forming the mold member using electroforming.

According to the method of manufacturing such an array substrate, the mold member having a protruding portion which forms a groove may be formed without having a shape as the groove which is formed in the array substrate in a mother die, by forming the mold member by causing a plating layer to be electrodeposited to the mother die using the electroforming, based on the mother die with a shape which is transferred to the array substrate. Accordingly, it is possible to form the mold member which includes the protruding portion as the groove using the mother die which is already produced, and a new mother die for forming the protruding portion is not necessary.

Application Example 4

A screen according to the application example includes, a substrate having thermoplasticity, in which a plurality of convex portions, or concave portions which is transferred in an array shape, and a groove are transferred to a substrate having thermoplasticity by a mold member having shapes of the convex portion, or the concave portion, and a protruding portion as the groove, and the transferred groove is formed to have a depth less than the thickness of the substrate, and is used for cutting out the outer edge portion of the substrate, and in which a reflective film which causes projection light to be reflected on the plurality of convex portions, or concave portions which is transferred to the substrate is included.

According to such a screen, the convex portion, or the concave portion in which the reflective film which causes the projection light to be reflected is formed, and the groove used for cutting out the outer edge portion which is not necessary as the screen are simultaneously formed by pressing and transferring the mold member which includes the shapes of the convex portion, or the concave portion, and the groove which are formed on the substrate to the substrate which is formed of a screen base material. In addition, the outer edge portion may be easily cut out by setting the depth of the transferred groove to be less than that of the substrate, when tearing up the substrate, and the outer edge portion, on the basis of the groove which is transferred to the substrate, without performing an adjustment of the substrate and a cut-out position. Due to this, the gap between the edge of a region of the substrate as the screen base material where the convex portion or the concave portion is formed and the edge of the substrate becomes constant, and it is possible to realize a screen with high external dimension precision. Accordingly, due to the high external dimension precision, it is possible to realize a screen which is easy to observe in which the projection light is prevented from being reflected to directions other than a predetermined direction, since a reflective film which causes the projection light to be reflected is formed at a predetermined portion.

Application Example 5

A method of a screen according to the application example includes, with respect to a substrate having thermoplasticity, forming a mold member having shapes of a plurality of convex portions, or concave portions which is transferred in an array shape, and a protruding portion as a groove; substrate transferring which transfers the shapes of the convex portion, or concave portion, and the protruding portion which are formed in the mold member, by pressing the mold member to the substrate; and forming a reflective film which causes projection light to be reflected with respect to the plurality of convex portions, or concave portions which is transferred to the substrate.

According to the method of manufacturing a screen, the shapes provided in the mold member are transferred to the substrate by forming the mold member including the shapes of the plurality of convex portions, or concave portions which is transferred to the substrate as the screen base material, and the protruding portion as the groove in the mold member forming processing, and by pressing the mold member to the substrate in the transfer processing. In addition, it is possible to simultaneously form the convex portion, or concave portion at which the reflective film reflecting the projection light is formed, and the groove used for cutting out the outer edge portion which is unnecessary as the screen. Due to this, the gap becomes constant between the edge of the first substrate surface of the substrate on which the convex portion, or the concave portion is formed and a holding area which is used to fix the array substrate to a device relating to the manufacturing the screen which is provided at the periphery of the edge of the first substrate surface. For this reason, it is possible to maintain a position where the reflective film is processed constantly, as well. Accordingly, it is possible to form the reflective film at a predetermined portion of the convex portion, or the concave portion corresponding to the projection light, and at which the reflective film is formed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments will be described on the basis of drawings. In addition, in each of drawings below, the dimension and ratio of each constituent element is appropriately differentiated from those of the actual constituent element, since each constituent element has the dimension to be recognized on the drawings.

First Embodiment

Figure 2A:
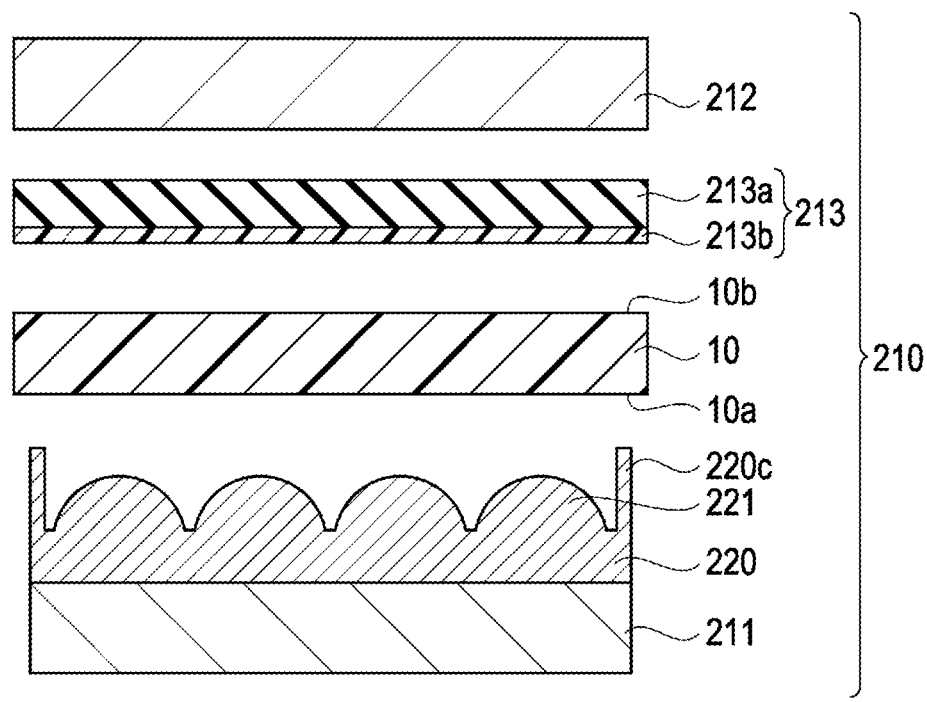
FIGS. 2A and 2B are schematic diagrams which show substrate transfer processing of a substrate according to the first embodiment.
Figure 2B:
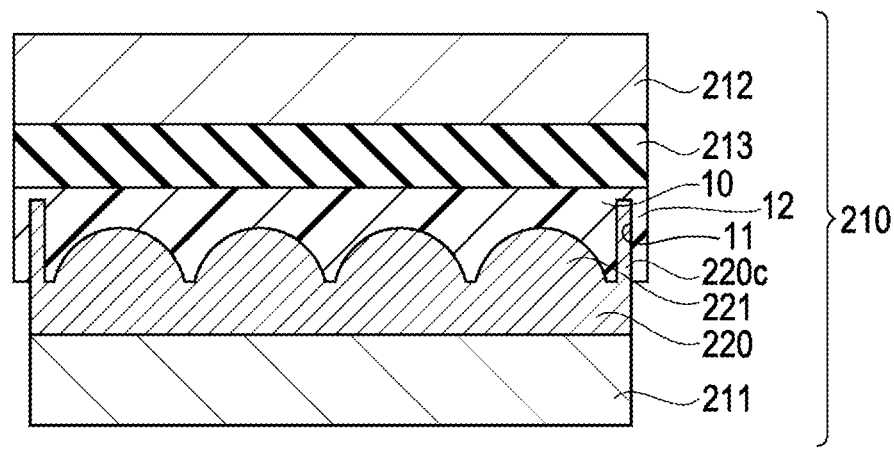
Figure 3A:
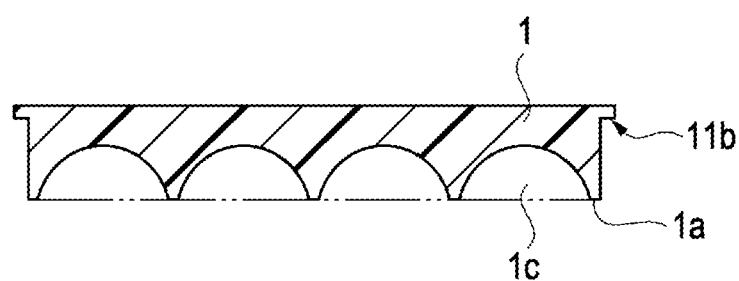
FIGS. 3A and 3B are schematic diagrams which show an array substrate which is formed using a method of manufacturing an array base material according to the first embodiment.
Figure 3B:
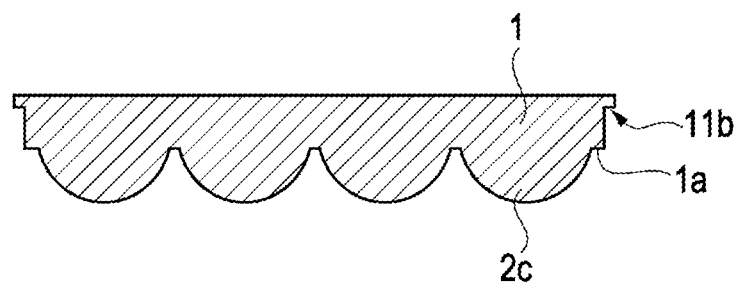

A method of manufacturing an array substrate 1 according to the embodiment, and the array substrate which is manufactured using the method will be described with reference to FIGS. 1A to 3B. FIGS. 1A to 1D are schematic diagrams which show formation processing of a mold member forming a mold member 220 which deforms a substrate as the array substrate 1. FIGS. 2A and 2B are schematic diagrams which show substrate transfer processing in which the shape of the mold member 220 is transferred to the array substrate. In addition, FIGS. 3A and 3B are schematic diagrams which show the array substrate 1 which is formed using a method of manufacturing an array base material according to the embodiment.

A method of manufacturing the array substrate 1 in which a concave portion, or a convex portion is formed in an array shape will be described. Mold member formation processing and substrate transfer processing are included in the processing of the method of manufacturing the array substrate 1.

Mold Member Forming Processing

Mold member forming processing is processing of forming a mother die (hereinafter, referred to as "master") which has a shape to form the array substrate 1. The mold member forming processing is configured by master forming processing, electricity casting processing (hereinafter, referred to as "electroforming processing"), and mold member machining processing.

In the mold member forming processing, a master 114 which is firstly formed according to the shape of the array substrate 1 is formed by the master forming processing. In the master forming processing, convex and concave shapes which are formed according to the convex and concave shapes formed in the array substrate 1 are formed in the master 114 using machining processing, or etching. In addition, the material of the master 114 may be a material such as metal, glass, resin, or the like, which can endure in a plating bath 110 due to the electroforming processing to be described later.

The electroforming processing is processing of duplicating the surface shape using electroplating in which the shape formed on the master main surface 114a is duplicated in a mold member 220 by performing electrodeposition in a plating layer as the mold member 220 on the master main surface 114a as the base of the surface shape, using the master 114.

When the surface of the master 114 is formed of a material with an insulating property, it is necessary to perform a conductive treatment on the master main surface 114a on which the surface shape is duplicated. In addition, when the surface of the master 114 is formed of a conductive material, it is necessary to form an insulating film 114b on the surface of the master 114 other than the master main surface 114a on which the shape of the master 114 is duplicated, and to perform an insulating treatment. Hereinafter, according to the embodiment, a case of using the master 114 with conductivity will be described.

Figure 1A:
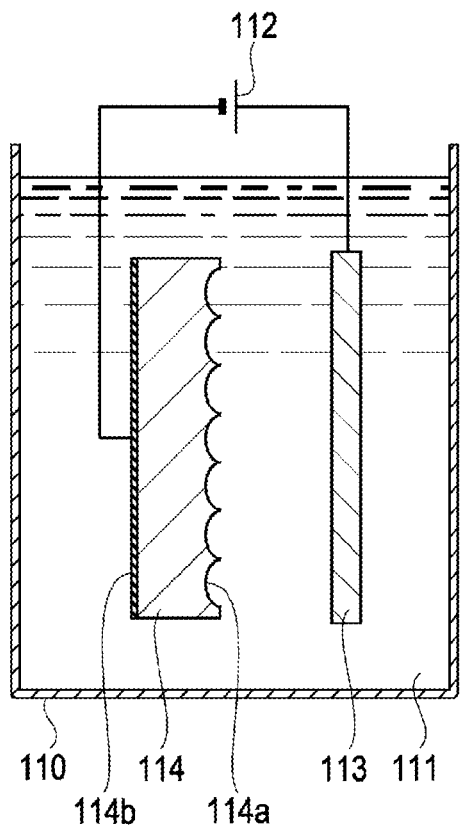
FIGS. 1A to 1D are schematic diagrams which show formation processing of a mold member according to a first embodiment.
Figure 1B:
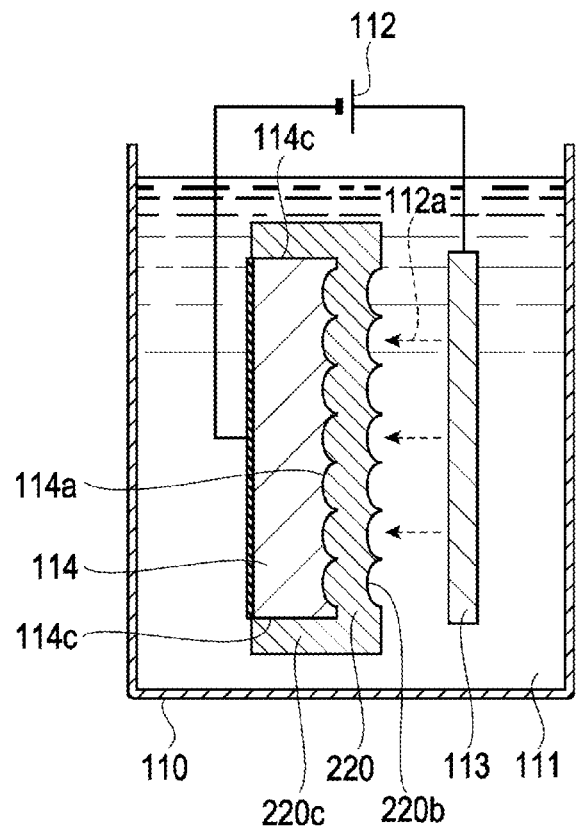

FIGS. 1A and 1B are diagrams which show schematic cross-sections of the mold member forming processing, and the master 114 and the mold member 220 which are formed in the mold member forming processing.

As shown in FIG. 1A, in the electroforming processing, the master 114, and an anode electrode 113 are immersed in the plating bath 110 which is filled with electrolyte 111 including metal ions formed of such as nickel, or copper, as a plated material. Subsequently, a DC power supply 112 is connected with the anode electrode 113 as the positive pole, and the master 114 as the negative pole (cathode), and a DC voltage is applied thereto. By applying the DC voltage, as shown in FIG. 1B, a current 112a flows to the master 114 as the cathode from the anode electrode 113 through the electrolyte 111. When the current 112a flows, a reduction reaction occurs in the conductive master main surface 114a and the master side surface 114c, the metal ions included in the electrolyte 111 are precipitated, and the plating layer is electrodeposited according to the shape of the master main surface 114a, thereby forming the mold member 220.

Here, the convex and concave shapes of the master main surface 114a are reproduced in the base surface 220b of the mold member 220, as well, since the plating layer which is formed by the electroforming processing grows substantially isotropic. In addition, since the master side surface 114c is a surface having a plane, the plating layer to be electrodeposited also has a plane shape, accordingly, it has substantially the same thickness as that of the plating layer to be electrodeposited to the master main surface 114a. The electroforming processing is performed until the mold member 220 with the predetermined thickness is formed by the plating layer.

Figure 1C:
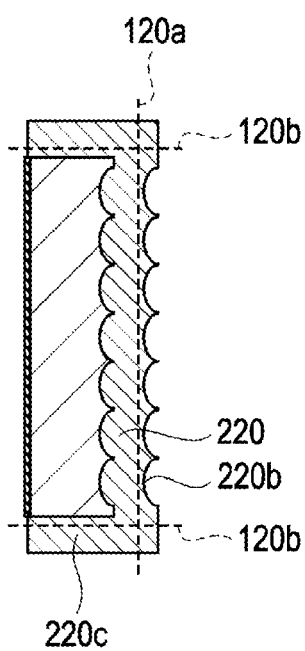

The mold member machining processing is a process in which the mold member 220 which is formed in the electroforming processing is pulled out from the master 114, the base surface 220b as the rear surface of the mold member 220 is planarized, and a protruding portion 220c is cut out. As shown in FIG. 1C, the base surface 220b on which the shape of the master main surface 114a is expressed is subject to the machining, since a force which is pressed to the substrate 10 is uniformly applied to the mold member 220 in a press transfer device 210 which is used for deforming the substrate 10, in substrate transfer processing to be described later. According to the embodiment, the convex and concave portions in which the shape of the master main surface 114a is expressed is grinded along a finish line 120a, and the base surface 220b is planarized.

Figure 1D:
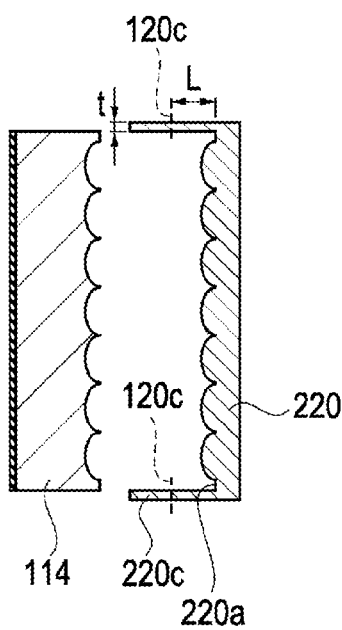

In addition, the protruding portion 220c which is formed in the mold member 220 is subject to the machining along the finish line 120b so as to have the thickness which is appropriate for the cutout, since a groove 11 for the cutout is formed in the substrate 10, in the substrate transfer processing to be described later. Further, as shown in FIG. 1D, after pulling out the master 114 and the mold member 220, the protruding portion 220c is subject to the machining along the finish line 120c so as to have the length which is appropriate for the cutout. In addition, according to the embodiment, the thickness t of the protruding portion 220c is set to about 0.1 mm, and the length L from the pressing surface 220a of the mold member 220 is cut out along the finish line 120c so as to be less than the thickness of the substrate 10. The shape of the end portion of the protruding portion 220c which is cut out is shown to be the right angle with respect to the protruding portion 220c in FIG. 1D, however, the end portion of the protruding portion 220c may be cut out to be diagonal.

In the description of the mold member forming processing, the top views of the master 114 and the mold member 220 are omitted, however, the mold member 220 which is formed in the mold member forming processing is provided with the protruding portion 220c which is formed therearound.

Substrate Transfer Processing

The substrate transfer processing which is shown in FIGS. 2A and 2B is a process in which the substrate 10 as the array substrate 1 is deformed. According to the embodiment, a plurality of concave portions 1c is transferred to a first substrate surface 10a of the substrate 10. In addition, the substrate transfer processing is performed using the press transfer device 210 as a transfer device which presses the mold member 220 to the heated substrate 10, while heating the mold member 220.

FIG. 2A is a schematic cross-section which shows a configuration of a press transfer device 210 and the substrate 10. FIG. 2B is a schematically cross-sectional view which shows a state in which the press transfer device 210 is operated, the substrate 10 is pressed, and the shape which is formed in the mold member 220 is transferred. The substrate transfer processing will be described with reference to FIGS. 2A and 2B.

The press transfer device 210 is a device in which the substrate 10 is pressed into a shape which is opposite to the shape formed in the substrate 10 with a high pressure from the vertical direction, while heating the mold member 220 which is formed in the above described mold member forming processing, and in which the substrate 10 is subject to a thermal deformation along the shape of the mold member 220, and a desired shape is formed by being transferred.

As shown in FIG. 2A, the press transfer device 210 is configured by including a lower side base 211 on the lower side of the substrate 10, and the mold member 220 having a convex portion 221 which is formed in a convex shape, and a protruding portion 220c on the upper part of the lower side base 211. In addition, the press transfer device 210 is configured by including an upper side base 212 on the upper side of the substrate 10.

A second substrate surface 10b side of the upper side base 212 is formed with a plane. In addition, the press transfer device 210 is provided with a buffer member 213 for applying a uniform pressure to the substrate 10 when pressing the substrate 10 with a high pressure between the upper side base 212 and the substrate 10.

According to the embodiment, as the buffer member 213, a combination of a felt member 213a which is formed of aramid fiber and a Teflon (registered trade mark) resin sheet 213b is used on a surface which comes into contact with the substrate 10. In addition, as the buffer member 213, it is possible to use silicon rubber.

In the substrate transfer processing, first, the substrate 10 to which the shape of the mold member 220 is transferred is supplied to the press transfer device 210. As shown in FIG. 2A, the supply of the substrate 10 is performed so that the first substrate surface 10a of the substrate 10 corresponds to the mold member 220, and the second substrate surface 10b corresponds to the buffer member 213. Subsequently, the supplied substrate 10 is preheated by the heated lower side base 211 and the upper side base 212, and the substrate 10 is pressed by being forced, when the upper side base 212 moves toward the fixed lower side base 211, thereafter.

As shown in FIG. 2B, in the substrate transfer processing, the first substrate surface 10a of the substrate 10 is deformed along the convex portion 221 which is formed in the mold member 220, and the shape of the mold member 220 is transferred, when the substrate 10 is pressed by the lower side base 211 and the upper side base 212 due to the press transfer device 210. In addition, the groove 11 is formed in the substrate 10, when the protruding portion 220c is pressed to the substrate 10, accordingly, the shape of the protruding portion 220c as the groove 11 is transferred to the substrate 10. In the formed groove 11, the outer edge portion 12 which is unnecessary for the array substrate 1 is cut out by tearing up the substrate 10 and the outer edge portion 12 of the groove 11, and a series of the array substrate manufacturing processing is completed.

FIGS. 3A and 3B are schematic diagrams which show the array substrate 1 which is formed using the manufacturing method of the above described array substrate 1. The concave portion 1c which is formed on the first substrate surface 1a of the array substrate 1 may be substituted by a convex portion 2c of a convex shape according to the specification of the array substrate. In this case, the mold member 220 includes a concave portion 222 instead of the convex portion 221, and forms the convex portion 2c of the convex shape in the first substrate surface 1a of the substrate 10 by the above described substrate transfer processing.

The array substrate 1 shown in FIG. 3A is the array substrate 1 which is formed using the mold member 220 provided in the convex portion 221. In the array substrate 1, the concave portion 1c of the concave shape is formed in the first substrate surface 1a along the shape of the convex portion 221 which is provided in the mold member 220. In addition, removal traces 11b remain in the array substrate 1 when the substrate 10 and the outer edge portion 12 are torn, and the outer edge portion 12 is cut out.

The array substrate 1 shown in FIG. 3B is the substrate 10 which is formed using the mold member 220 included in a concave portion 222 which is not shown. In the array substrate 1, the convex portion 2c of the convex shape is formed on the first substrate surface 1a along the shape of the concave portion 222 provided in the mold member 220. As described above, the resection remains 11b remains in the array substrate 1.

According to the above described first embodiment, following effects can be obtained.

In the array substrate 1 according to the embodiment, the plurality of convex portion 2c, or concave portion 1c which is formed in the array shape in the substrate 10 as the array substrate 1, and the groove 11 are simultaneously transferred and formed by the mold member 220 which has the shapes of the convex portion 2c, or concave portion 1c, and the groove 11 which are formed in the substrate 10. In addition, the depth of the transferred groove 11 is set to be less than that of the substrate 10.

Due to this, since the gap between the edge of a region where the convex portion 2c, or the concave portion 1c which is formed in the array substrate 1 is formed and the groove 11 becomes constant, it is possible to realize an array substrate 1 with a high external dimension precision by tearing up the substrate 10, and the outer edge portion 12 on the basis of the groove 11. Accordingly, in an optical product to which such an array substrate 1 is applied, it is possible to maintain the position to which the array substrate 1 is attached constantly. For example, when the concave portion 1c, or the convex portion 2c which is formed in the array substrate 1 is applied as a lens array, it is possible to perform a predetermined condensing or diffusion with respect to light flux which transmits the array substrate 1 without being distorted.

In a method of manufacturing the array substrate 1 according to the embodiment, it is possible to simultaneously form the convex portion 2c, or concave portion 1c, and the groove 11 which are provided in the mold member 220, by pressing the mold member 220 which includes the plurality of convex portions 2c, or concave portions 1c, and the protruding portion 220c as the groove 11 which are transferred to the substrate 10 as the array substrate 1 into the substrate 10, by the transfer processing.

Due to this, it is possible to cut out the outer edge portion 12 by performing tearing up on the basis of the groove 11 which is formed, without performing the adjustment of the substrate 10 and the portion to be cut out, when cutting out the outer edge portion 12. In addition, it is possible to suppress a deformation of the substrate 10 due to the tear strength, and to suppress the resection remains 11b at the end surface of the substrate 10, since the end portion of the transferred groove 11 becomes an acute angle, because the end portion of the protruding portion 220c is diagonally cut. Accordingly, it is possible to perform the cutout of the outer edge portion 12 without providing a process or a device for cutting out the outer edge portion 12, and to realize a method of manufacturing the array substrate 1 in which time and expense for manufacturing thereof can be reduced.

In the method of manufacturing the array substrate 1 according to the embodiment, a plating layer is electrodeposited to the master 114 using the electroforming processing, on the basis of the master 114 which includes the shapes which are transferred to the array substrate 1, and the mold member 220 is formed. At this time, the plating layer is also electrodeposited to the master side surface 114c. In this manner, it is possible to electrodeposit the shape as the groove 11 which is formed in the array substrate 1 to the master side surface 114c, as well, and to form the mold member 220 including the protruding portion 220c which forms the groove 11. Accordingly, it is possible to form the mold member 220 which is provided with the protruding portion 220c as the groove 11, including the master 114 which is produced in advance.

Second Embodiment

The embodiment is a method of manufacturing a screen including a reflective film which reflects incident light, and which is manufactured using a method of manufacturing the array substrate 1 described in the first embodiment.

Figure 4:
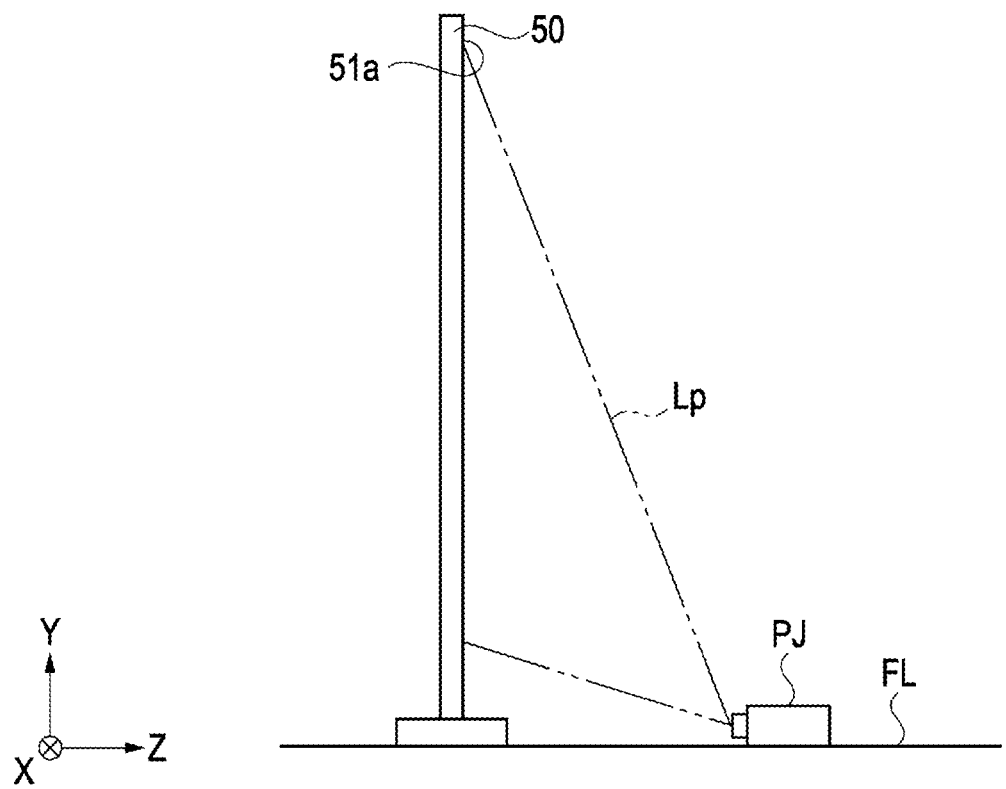
FIG. 4 is a schematic diagram which shows an installation example of a screen according to a second embodiment.
Figure 5A:
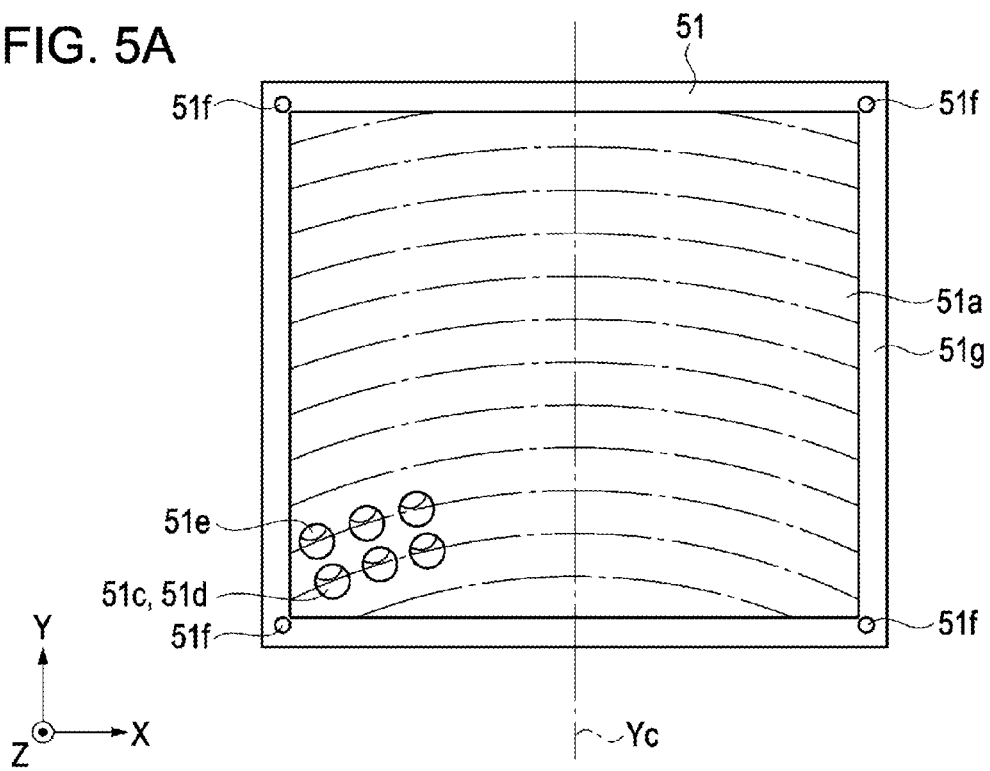
FIGS. 5A and 5B are schematic diagrams which show transfer processing and the front surface of a screen base material according to the second embodiment.
Figure 5B:
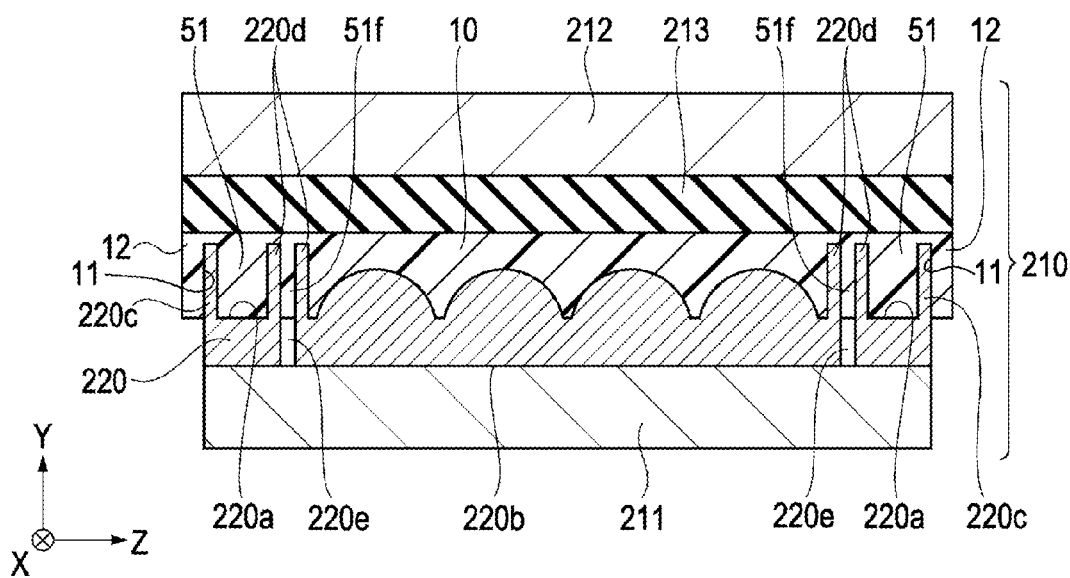
Figure 6:
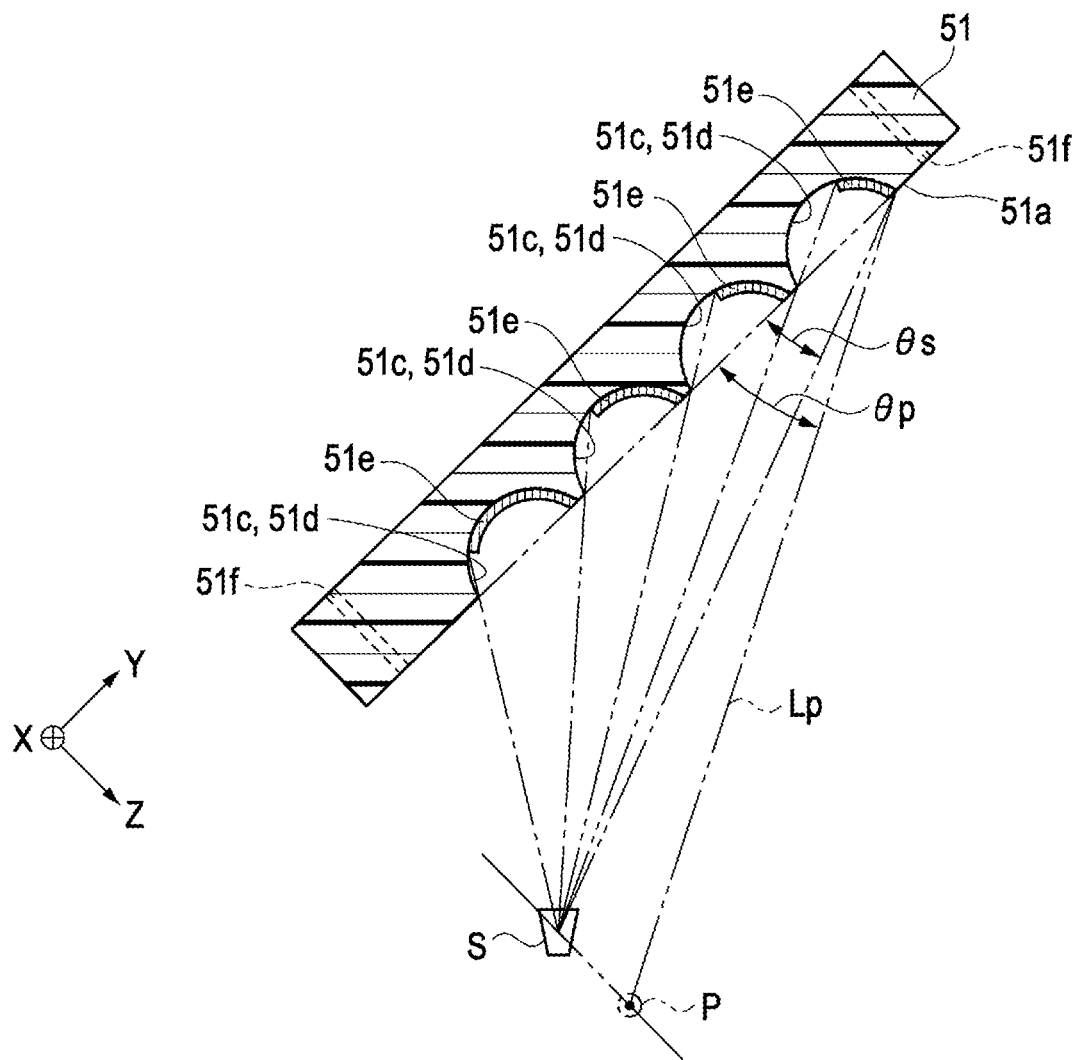
FIG. 6 is a schematic diagram which shows a formation processing of a reflective film of the screen base material according to the second embodiment.
Figure 7A:
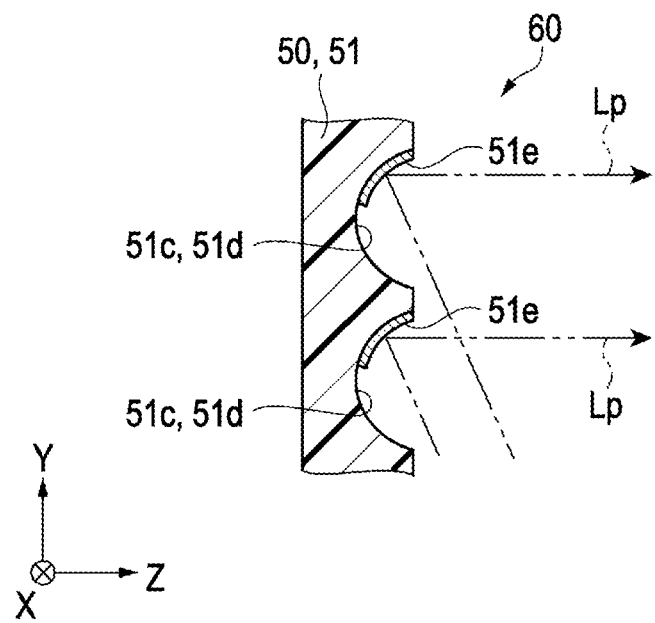
FIGS. 7A and 7B are schematically cross-sectional diagrams which schematically show a part of the screen surface according to the second embodiment.
Figure 7B:
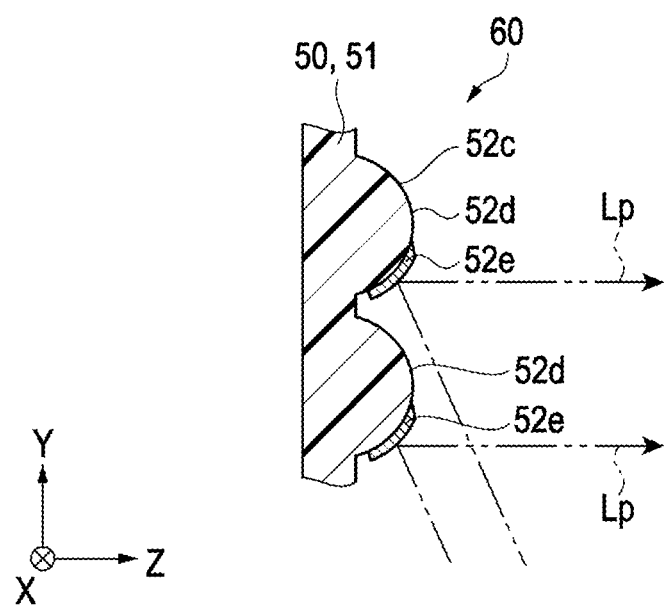

FIG. 4 is a schematic view which shows an installation example of the screen according to the embodiment. FIGS. 5A and 5B are schematic views which show transfer processing of a screen base material which is manufactured using the manufacturing method of the array substrate 1 described in the first embodiment, and the surface of the screen base material. FIG. 6 is a schematic view which shows formation processing of the reflective film of the screen according to the embodiment. In addition, FIGS. 7A and 7B are schematically cross-sectional views which schematically show a part of the screen surface according to the embodiment.

The method of manufacturing the screen according to the embodiment, and the screen which is manufactured using the method of manufacturing will be described using FIGS. 4 to 7B. In the drawings of FIGS. 4 to 7B, the direction Y which is perpendicular to a floor FL, the direction X which is parallel to a first substrate surface 51a of a screen 50, and goes straight to the Y direction, and the Z direction which is orthogonal to the Y direction and X direction are described in the XYZ orthogonal coordinate system. In addition, by setting the direction in which action of gravity is made as a reference, the direction in of falling is made set to the downward direction, and the direction opposite thereto is set to the upward direction.

As shown in FIG. 4, the screen 50 according to the embodiment reflects projection light Lp which is emitted from a projection-type display device such as a projector PJ which is provided on the floor FL in the vicinity of the screen 50 on the first base material surface 51a of the screen 50, and observes the projection light Lp which is reflected.

As shown in FIG. 5A, in a screen base material 51, concave portion 51c is formed substantially in the entire region of the first base material surface 51a as the surface of the screen base material 51. The concave portion 51c is arranged in an arc shape in which a predetermined position in the X direction on the center line Yc of the screen base material 51 is the center, and in the Y direction, the screen base material 51 which is arranged in concentric circles which are concentric with this center is formed by the transfer processing according to the first embodiment. In addition, FIG. 5A is a diagram in which one screen of the screen base material 51 is seen.

In addition, in the screen base material 51, an installing hole 51f is formed in a holding area 51g as the periphery of the first base material surface 51a on which the concave portion 51c is formed by the above described transfer processing according to the first embodiment. The installing hole 51f is formed in order to install the screen base material 51 to a deposition mechanism (not shown), when performing formation processing of the reflective film to be described later.

As shown in FIG. 5B, when performing the formation of the installing hole 51f, a hole 220e with the shape of the installing hole 51f is perforated using a drill blade or the like from the base surface 220b at a predetermined position of the mold member 220 which is described in the first embodiment, and performs the transfer processing of a shape which is formed in the mold member 220 to the screen base material 51 using a burr which occurs in a pressing surface 220a as the protruding portion 220d. By performing the transfer processing, the plurality of concave portion 51c, the installing hole 51f, and the groove 11 which is used for cutting out the outer edge portion 12 are simultaneously formed in the screen base material 51.

The process of the method of manufacturing the screen according to the embodiment includes a reflective film formation process. In addition, the screen base material 51 according to the embodiment is formed using the method of manufacturing the array substrate 1 which is described in the first embodiment, and the outer edge portion 12 is cut out. Further, in the method of manufacturing the screen according to the embodiment, processing relating to the method of manufacturing the screen is performed from the reflective film formation processing.

The reflective film formation processing is processing of forming a reflective film 51e which selectively reflects the projection light Lp on the inner surface 51d of the concave portion 51c. In addition, the reflective film formation processing according to the embodiment is configured by deposition processing in which the reflective film 51e which is formed of aluminum is formed by deposition.

In the deposition processing in FIG. 6, the screen base material 51 is installed to the deposition mechanism using the installing hole 51f so that the first base material surface 51a of the screen base material 51 is inclined with respect to the upper part of the deposition source S. In addition, the first base material surface 51a of the screen base material 51 is installed in a state where the upper side denoted in the Y axis direction of the screen 50 shown in FIG. 4 is separated from the deposition source S compared to the lower side. Further, the deposition source S is provided on the lower side of the screen base material 51 on the center line Yc shown in FIGS. 5A and 5B.

Returning to FIG. 6, the deposition processing will be described in detail. In the deposition processing, the position of the projector PJ which diagonally emits the projection light Lp is predetermined as a virtual light source position P with respect to the first base material surface 51a of the screen base material 51 when forming the reflective film 51e. Here, in the arrangement of the deposition source S, the deposition source S is arranged so that the angle θs of a deposition material with respect to the concave portion 51c which is formed on the first base material surface 51a is equal to the input angle θp of the projection light Lp from the virtual light source P with respect to each concave portion 51c of the first base material surface 51a, or smaller than that, and the deposition material is deposited to each of the concave portions 51c from the input direction of the projection light Lp.

By performing the above described deposition processing, the reflective film 51e is formed along a region where the projection light Lp is projected to the inner surface 51d of the concave portion 51c. In addition, the reflective film 51e is formed in a radial pattern and partially in each of the concave portions 51c of the first base material surface 51a of the screen base material 51 about the evaporation source S, by performing the deposition in the diagonal direction in this manner, and selectively forming the reflective film 51e. According to the embodiment, the deposition method is used for forming the reflective film 51e, however, it is possible to form the reflective film 51e using a spray coating method, or a printing method.

FIG. 7A is a schematically cross-sectional view which schematically shows a part of the screen 50 which is formed using the above described method of manufacturing the screen. In the formed screen 50, the projection light Lp which is projected from the projector PJ is reflected to the viewer side (Z axis direction) by the reflective film 51e of the concave portion 51c which is formed on the screen 50. In addition, when unnecessary light from outside 60 is input from room light or the like to the screen 50, the light is absorbed to the concave portion 51c other than the reflective film 51e, accordingly, it is possible to suppress the light to be reflected to the viewer side.

In addition, FIG. 7B is a schematically cross-sectional view which schematically shows a part of the screen 50 in which the concave portion 51c formed on the screen 50 according to the embodiment is substituted by the convex portion 52c. The screen 50 shown in FIG. 7B is a screen 50 which uses the array substrate 1 in which the convex portion 52c in a convex shape is formed instead of the concave portion 51c which is formed on the first base material surface 51a of the screen base material 51 as the screen base material 51. A difference from the above described screen 50 is that the plurality of convex portions 52c is formed on the first base material surface 51a of the screen base material 51, and reflective films 52e are selectively formed on the convex portions 52c.

In addition, the reflective film formation processing in which the reflective film 52e is formed is performed using the same processing and method as those of the screen 50 including the above described concave portion 51c.

The reflective film formation processing which forms the reflective film 52e is performed after the transfer processing in the first embodiment. In the reflective film formation processing, as in the screen base material 51 including the above described concave portion 51c, the reflective film 52e is selectively formed at the outer surface 52d of the convex portion 52c, by being deposited in the diagonal direction of the screen base material 51 using the deposition processing.

According to the above described second embodiment, it is possible to obtain the following effects.

According to the method of manufacturing the screen 50 in the embodiment, when manufacturing the screen 50 which reflects the projection light Lp, it is possible to make the gap between the edge of the first base material surface 51a on which the convex portion 52c, or the concave portion 51c is formed and the edge of the holding area 51g which is provided at the periphery thereof becomes constant, by using the above described array substrate 1 as the screen base material 51. Due to this, it is possible to make the machining quality be uniform, since the gap between the holding area 51g which is used for fixing the screen base material 51 to a device used in the screen manufacturing processing and the first base material surface 51a becomes constant, accordingly, the machining position becomes constant. Therefore, it is possible to form the reflective film at a predetermined portion corresponding to the projection light of the convex portion, or the concave portion at which the reflective film is formed, in the reflective film formation processing.

According to the screen in the embodiment, since the reflective film which reflects the projection light Lp which is projected to the screen 50 is formed at a predetermined portion, it is possible to realize a screen which is easily observed, and in which the reflection of the projection light Lp in the other direction than the predetermined direction is suppressed.

In addition, it is possible to execute the invention using a variety of changes and modifications without being limited to the above described embodiments, and without departing from the scope of the invention. The modification examples will be described below.

Modification Example 1

The array substrate 1 according to the first embodiment is formed with the semicircular convex portion 2c, or the concave portion 1c which is aligned. However, the shape of the array substrate is not limited to this, and may be formed with a polygonal semicircular convex portion 2c, or the concave portion 1c which is aligned.

Modification Example 2

The screen 50 according to the second embodiment uses the array substrate 1 in which the semicircular convex portion 52c, or the concave portion 51c is formed to be aligned. However, the shape of the array substrate is not limited to this, and it is possible to configure the screen by forming the reflective film using the array substrate 1 in which the polygonal semicircular convex portion 52c, or the concave portion 51c is formed to be aligned.

What is claimed is:

1. An array substrate comprising:
a substrate having thermoplasticity,
wherein a plurality of convex portions or concave portions, which is transferred in an array shape, and a groove are transferred to the substrate having thermoplasticity by a mold member having shapes of the convex portions or the concave portions and a protruding portion corresponding to the groove, and
wherein the transferred groove is formed to have a depth less than the thickness of the substrate and greater than the maximum thickness of the convex portions or the concave portions in the thickness direction of the substrate, and is used for cutting out the outer edge portion of the substrate.

2. The array substrate of claim 1, wherein the transferred groove is formed adjacent an outer edge portion of the substrate.

3. The array substrate of claim 2, wherein the transferred groove extends along the outer edge portion of the substrate.

4. A method of manufacturing an array substrate comprising, with respect to a substrate having thermoplasticity:
transferring shapes of a plurality of convex portions or concave portions and a protruding portion, which are formed in a mold member, to the substrate by pressing the mold member to the substrate,
wherein the mold member, which has shapes of the plurality of convex portions or concave portions and the protruding portion corresponding to a groove, which are transferred to the substrate, is included with respect to the substrate,
wherein the transferred groove is formed to have a depth less than the thickness of the substrate and greater than the maximum thickness of the convex portions or the concave portions in the thickness direction of the substrate.

5. The manufacturing method of the array substrate according to claim 4, further comprising:
forming the mold member using electroforming.

6. A screen comprising:
a substrate having thermoplasticity; and
a reflective film causing projection light to be reflected on the plurality of convex portions or concave portions which is transferred to the substrate,
wherein a plurality of convex portions or concave portions, which is transferred in an array shape, and a groove are transferred to the substrate having thermoplasticity by a mold member having shapes of the convex portions or the concave portions and a protruding portion corresponding to the groove, and
wherein the transferred groove is formed to have a depth less than the thickness of the substrate and greater than the maximum thickness of the convex portions or the concave portions in the thickness direction of the substrate, and is used for cutting out the outer edge portion of the substrate.

7. A method of manufacturing a screen comprising, with respect to a substrate having thermoplasticity:

forming a mold member having shapes of a plurality of convex portions or concave portions, which is transferred in an array shape, and a protruding portion corresponding to a transferred groove;

transferring the shapes of the convex portions or the concave portions and the protruding portion, which are formed in the mold member, to the substrate by pressing the mold member to the substrate; and forming a reflective film which causes projection light to be reflected with respect to the plurality of convex portions or concave portions, which is transferred to the substrate, wherein the transferred groove is formed to have a depth less than the thickness of the substrate and greater than the maximum thickness of the convex portions or the concave portions in the thickness direction of the substrate.

\* \* \* \* \*